UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,447, dated November 22, 1892.

Application filed December 15, 1891. Serial No. 415,186. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 6,) of which the following is a full, clear, concise, and exact description.

My invention relates to the process and composition of matter used in the production of cement or artificial stone; and its object is to produce a stone or cement which has magnesium as a base, but which possesses the quality heretofore wanting in magnesium artificial stones of being proof against the attack of atmospheric and climatic influences.

In this process I take six ounces of oleic acid or any other oil which can be saponified and saponify the same by pouring it into a cold strong solution of caustic soda and stirring the same continually. After the oil is saponified I let the same stand until the oil rises to the surface. I take this saponified oil and mix it with fifty pounds magnesium oxide, three gallons concentrated solution of magnesium sulphate of at least 20° Baumé, and ten ounces of a saturated solution of aluminium sulphate potassium, which when thoroughly mixed forms a binding material in the proportions of one part binding material to from one to twenty parts of the inert substance. The resulting product is an artificial stone in a plastic state, and while in a plastic state it may be molded in any desired form or applied to walls or other surfaces like plaster. Its consistency may be varied by the addition of water, as desired.

The various ingredients may be varied as to their proportions without seriously-detrimental results.

The best results with this process are secured by the use of sand, quartz, or other non-absorbent inert material. When using sawdust or other porous substances, a greater quantity of magnesium-sulphate solution is desirable to replace portions of the magnesium sulphate which is absorbed by the porous substances, and thereby prevented from entering into chemical combination with the magnesium oxide or aluminium palmitate. The insoluble metallic magnesium soap, chemically called "oleate of magnesium," in combination with aluminium palmitate in the above-described combination is thoroughly incorporated with the body of the stone, and this acts as a preventive to the attack of carbonic-acid gas and moisture. The saponified oil may be applied in its pure state to the artificial-stone mass, consisting of magnesium oxide, solution of magnesium sulphate, and aluminium sulphate potassium alone. In this process part of the solution of magnesium sulphate enters into chemical combination with the saponified oil and aluminium sulphate potassium and produces an oleate of magnesium and aluminium palmitate or a metallic magnesium aluminium soap, while the surplus of the sulphate of magnesium is taken up by and enters into a chemical combination with the magnesium oxide, forming an oxysulphate of magnesium. The stone therefore will consist of oxysulphate of magnesium in combination with oleate of magnesium and aluminium palmitate. The combined substances are perfectly proof against moisture, perfectly insoluble, and not attacked by carbonic-acid gas.

By varying the inert substance used as the base of the stone I can produce cement adapted to the various purposes for which it is intended to be used. I can also imitate various natural products—such as marble, granite, sandstone, &c.—and the cheapness of the mixture produced by this process is such that it can be used for many purposes for which less-lasting and more-expensive stones are excluded.

Having thus described my invention, what I claim as new, and desire to secure by Letters Patent, is—

1. The process of producing cement, which consists of mixing saponified oil with magnesium oxide, magnesium sulphate, and aluminium sulphate while in the plastic state and while the same is still plastic adding thereto inert material, whereby the cement is rendered capable of resisting the attacks of moisture and carbonic-acid gas.

2. The herein-described composition of matter for the production of artificial stone, consisting of saponified oil, magnesium oxide, magnesium sulphate, aluminium sulphate potassium, and an inert substance, in substantially the proportions specified.

In witness whereof I hereunto subscribe my name this 12th day of December, A. D. 1891.

LOUIS ENRICHT.

Witnesses:
CHARLES A. BROWN,
GEORGE L. CRAGG.